(12) United States Patent
Ball et al.

(10) Patent No.: US 6,883,534 B2
(45) Date of Patent: Apr. 26, 2005

(54) FREEZE PROTECTION DEVICE FOR WALL HYDRANTS/FAUCETS

(75) Inventors: William T. Ball, Colorado Springs, CO (US); Cody W. Jackson, Colorado Springs, CO (US); Lawrence Almasy, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 15 days.

(21) Appl. No.: 10/640,909

(22) Filed: Aug. 14, 2003

(65) Prior Publication Data

US 2005/0034757 A1 Feb. 17, 2005

(51) Int. Cl.[7] .............. F16K 31/64; E03B 7/08; E03B 7/12; F16L 55/07
(52) U.S. Cl. .............. 137/60; 137/61; 137/62; 137/301; 137/360; 137/539; 137/540; 137/614.2; 138/32
(58) Field of Search .............. 137/59, 60, 61, 137/62, 218, 301, 302, 360, 801, 78.1, 79, 107, 539, 540, 614.2; 138/27, 32

(56) References Cited

U.S. PATENT DOCUMENTS

| | | | | |
|---|---|---|---|---|
| 1,021,537 A | * | 3/1912 | Lawnin | 137/301 |
| 1,069,003 A | * | 7/1913 | Haennig | 137/107 |
| 1,433,110 A | * | 10/1922 | Buckler | 137/301 |
| 1,828,763 A | * | 10/1931 | Carnes | 137/107 |
| 2,730,326 A | * | 1/1956 | Staben | 137/302 |
| 3,070,116 A | * | 12/1962 | Noland et al. | 137/302 |
| 3,244,192 A | * | 4/1966 | Noland | 137/302 |
| 3,380,464 A | * | 4/1968 | Arterbury et al. | 137/60 |
| 4,182,356 A | | 1/1980 | Woodford, Sr. | |
| 4,483,361 A | * | 11/1984 | Jungbert, Sr. | 137/301 |
| 4,700,732 A | * | 10/1987 | Francisco | 137/360 |
| 4,776,362 A | * | 10/1988 | Domingue et al. | 137/59 |
| 4,909,270 A | * | 3/1990 | Enterante et al. | 137/107 |
| 5,241,981 A | * | 9/1993 | Ahern | 137/318 |
| 5,551,473 A | * | 9/1996 | Lin et al. | 137/218 |
| 6,142,172 A | * | 11/2000 | Shuler et al. | 137/360 |
| 6,363,960 B1 | * | 4/2002 | Gauss | 137/60 |
| 6,532,986 B1 | * | 3/2003 | Dickey et al. | 137/360 |

FOREIGN PATENT DOCUMENTS

| | | | | |
|---|---|---|---|---|
| CA | 447072 | * | 3/1948 | 137/60 |
| DE | 344054 | * | 11/1921 | 137/614.2 |
| DE | 294986 | * | 10/1936 | 137/107 |
| FR | 1124014 | * | 10/1956 | 137/301 |

* cited by examiner

Primary Examiner—George L. Walton

(57) ABSTRACT

A freezeless wall hydrant has a normally horizontal fluid inlet tube with an interior end and exterior end. A hollow valve fitting is rigidly secured to the interior end of the inlet tube for a connection to a source of pressurized fluid. A valve seat is located on an interior end of the valve fitting. A valve body is longitudinally movably mounted in the inlet tube adjacent to the valve fitting. A pressure relief valve is mounted on the inlet tube between the interior and exterior ends thereof so that if residual water within and adjacent the exterior end of the inlet tube freezes and exerts pressure on residual fluid within the inlet tube adjacent the interior end thereof, the pressure relief valve will actuate to purge some of the high pressure fluid to decrease the pressure being exerted by such fluid to the interior of the inlet tube.

8 Claims, 2 Drawing Sheets

US 6,883,534 B2

FREEZE PROTECTION DEVICE FOR WALL HYDRANTS/FAUCETS

BACKGROUND OF THE INVENTION

Freezeless wall hydrants and faucets have long been in existence. They characteristically have a fluid closure valve located in the end of an inlet pipe located within the wall or a warmer interior area of the building of which the wall is a part. This closure valve is operated by an elongated rod connected to an exterior handle. The freezeless characteristics of the hydrant are caused by the closure valve shutting off the flow of water within the wall or building at a freezing temperature, with the residual water in the inlet pipe flowing by gravity outwardly through the conventional outlet drain of the hydrant.

The foregoing structure works very successfully except in situations where a hose or the like is attached to the outlet drain of the hydrant, whereupon the residual water is not able to easily flow by gravity out of the hydrant when the closure valve connected to the pressurized water is closed. With a hose attached during freezing weather, the residual water freezes within the hydrant, and the inlet pipe or related components thereupon rupture from the freezing conditions within the hydrant.

It has in recent times been recognized that the rupture of such a hydrant under freezing weather conditions does not take place because of the frozen water in the hydrant. Rather, the rupture results from the ice imposing severe pressure on the captivated non-frozen fluid in the inlet pipe. Thus, the increased pressure on this water by the expanded ice is the principal cause for the rupture of the hydrant.

Accordingly, it is a principal object of this invention to provide a freezeless wall hydrant which has the ability to relieve the pressure on the residual water located inwardly of frozen residual water located outwardly thereof when that water freezes by reason of a hose or the like being attached to the discharge nozzle.

A further object of the invention is to provide a pressure release valve within the hydrant to accommodate the high pressure fluid.

These and other objects will be apparent to those skilled in the art.

SUMMARY OF THE INVENTION

A freezeless wall hydrant has a normally horizontal fluid inlet tube with an interior end and exterior end. A hollow valve fitting is rigidly secured to the interior end of the inlet tube for a connection to a source of pressurized fluid. A valve seat is located on an interior end of the valve fitting.

A casting member is rigidly secured to the outer end of the inlet tube and includes a drain conduit in communication with an interior of the inlet tube for discharging water from the hydrant. A valve body is longitudinally movably mounted in the inlet tube adjacent to the valve fitting. A valve seating element is on the valve body and is adapted to engage and disengage the valve seat to prevent or to permit, respectively, a fluid flow through the valve fitting into the inlet tube.

An elongated operating rod has a rearward end secured to the valve body and an outer end protruding from the casting member for longitudinally moving the valve body in the inlet tube.

A pressure relief valve is mounted on the inlet tube between the interior and exterior ends thereof so that if residual water within and adjacent the exterior end of the inlet tube freezes and exerts pressure on residual fluid within the inlet tube adjacent the interior end thereof, the pressure relief valve will actuate to purge some of the high pressure fluid to decrease the pressure being exerted by such fluid to the interior of the inlet tube.

DESCRIPTION OF THE PREFERRED EMBODIMENT

Figure 1:
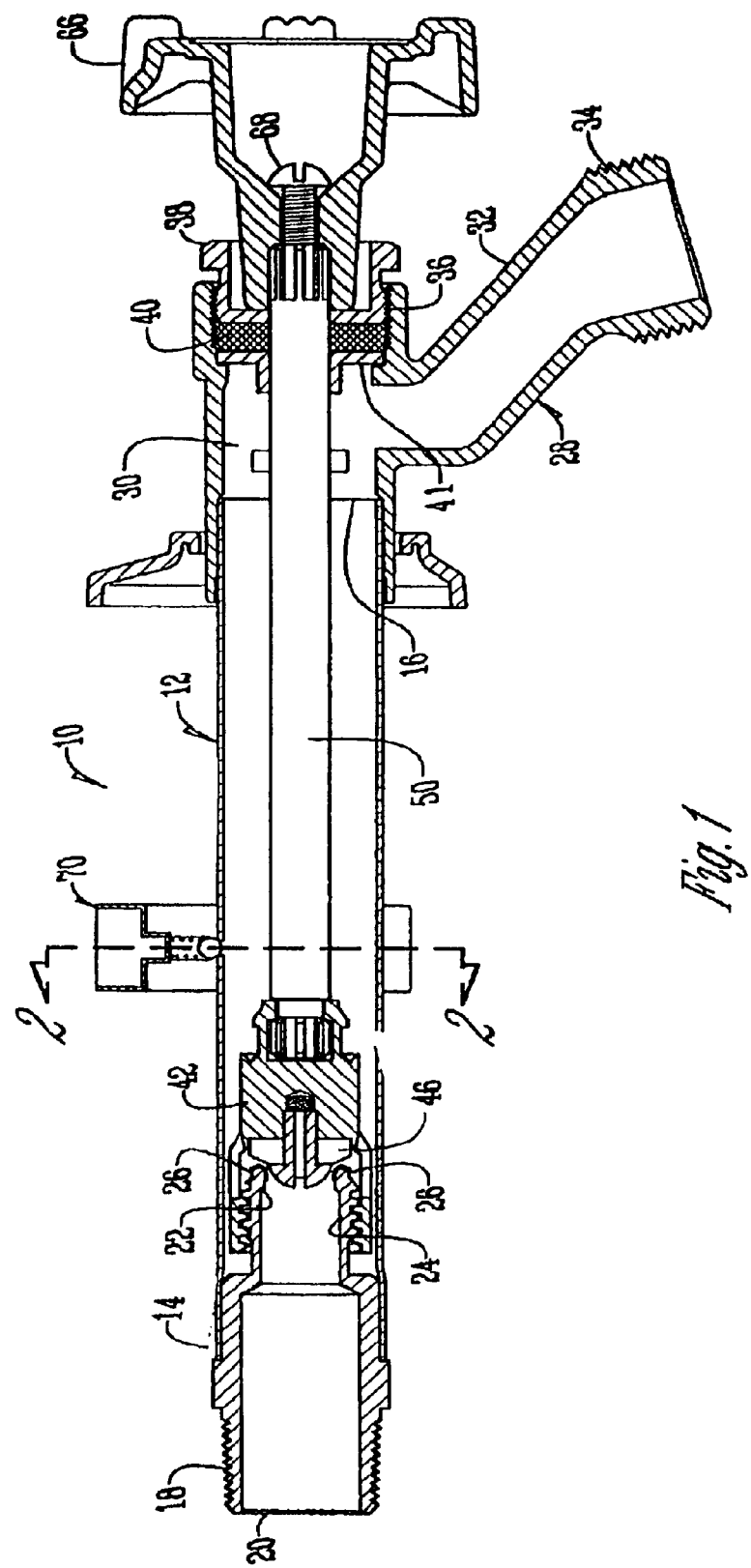
FIG. 1 is an elongated sectional view of a wall hydrant embodying the instant invention.
Figure 2:
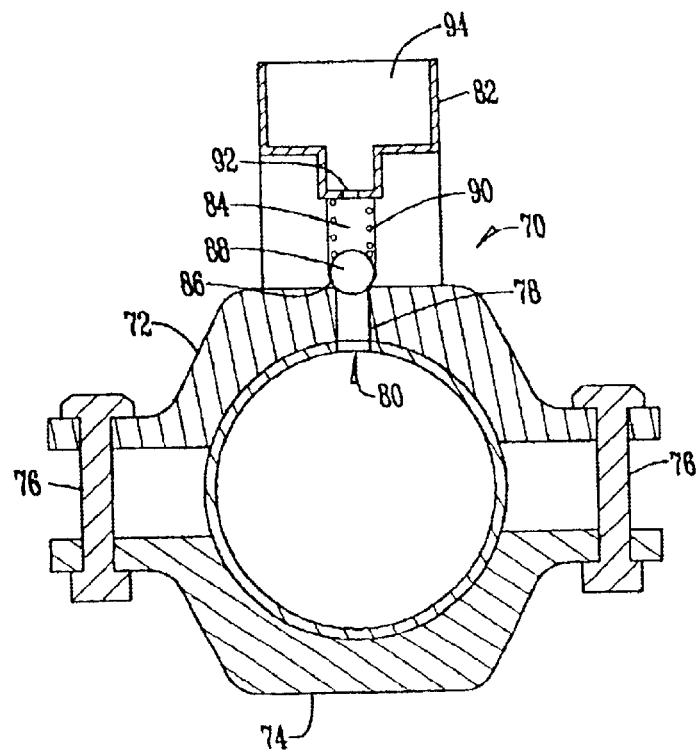
FIG. 2 is an enlarged sectional view taken on line 2—2 of FIG. 1.

The hydrant 10 in FIG. 1 has an elongated hollow water inlet tube 12 which has an interior end 14 and an exterior end 16. A hollow valve fitting 18 is rearwardly secured to the interior end 14 of tube 12 and has an inlet end 20 adapted to be secured to a conduit connected to a source of pressurized fluid (not shown). The fitting 18 has an interior end 22 with external threads 24 and which terminates in a valve seat 26.

A casting member 28 with hollow interior end 30 is rigidly connected to the exterior end 16 of inlet tube 12. A conventional fluid drain conduit 32 is located within casting member 28 and is in communication with the interior of tube 12. Conventional threads 34 are located on the discharge end of conduit 32 to receive a conventional hose or the like. Casting member 28 also has a threaded aperture 36 which is adapted to receive a conventional bushing 38 which in turn receives packing 40 which is held in tight engagement with bushing 38 by packing washer 41 (FIG. 1).

With reference to FIG. 1, a valve body 42 has a bore at its inner end which engages the inner end 22 of hollow valve fitting 18. Valve body 42 has a valve element 46 that seats on valve seat 26. Valve body 42 has an outer end that is connected to the inner end of elongated rod 50 which extends along the center line of tube 12. The outer end 52 of rod 50 extends through bushing 38, packing 40 and packing washer 41 and is connected to operating handle wheel 66 by means of screw 68.

Figure 3:
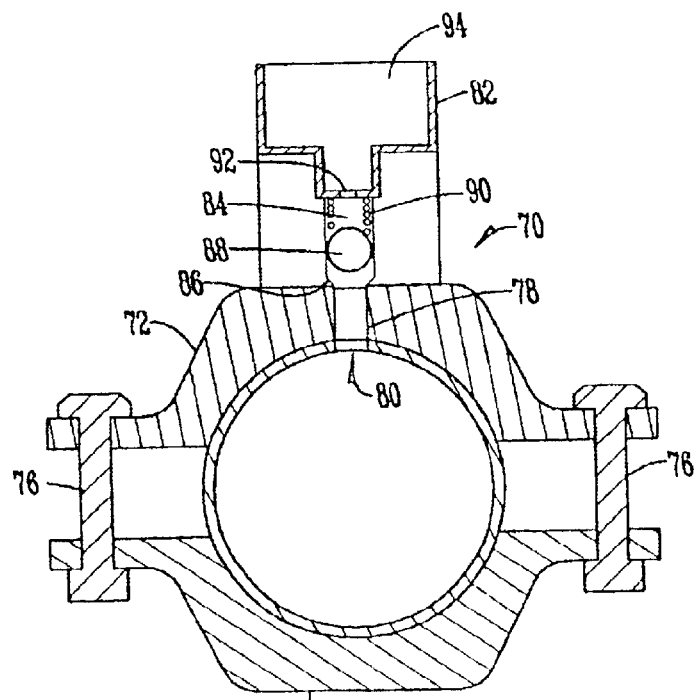
FIG. 3 is a sectional view similar to FIG. 2 but shows the check valve in an open position.

A pressure relief valve 70 is mounted on intake tube 12 adjacent its inner end by means of clamp elements 72 and 74 which are rigidly held to tube 12 by nut and screw assemblies 76. Clamp element 72 has a vertical bore 78 which registers with aperture 80 in tube 12 (FIGS. 1 and 3). Block 82 is rigidly secured to clamp element 72 and has a center bore 84 to create shoulder 86 at the bottom of bore 84. Ball 88 typically rests on shoulder 86 to seal the upper end of bore 78 to prevent fluid flow. Compression spring 90 bears on ball 88 to yieldingly hold the ball on shoulder 86. The upper end of spring 90 bears on a suitable crossbar 92 extending across the bottom of reservoir well 94.

In operation, if the formation of ice later occurs adjacent the outer end of inlet tube 12 to cause compression of residual water adjacent the inner end of tube 12 below valve 70, the pressurized residual water will unseat ball 88 from shoulder 86 to permit the pressurized water to flow upwardly around ball 88 to enter reservoir well 94. Spring 90 will in such case compress to permit ball 88 to open. The spring 90 should be of sufficient strength that it will not compress unless the bottom of the ball is subjected to about 100 psi of fluid pressure. This will relieve the pressure on the residual liquid adjacent the inner end of tube 12.

Typically, the removal of a teaspoon of residual water from the inner end of intake tube 12 will be sufficient to keep the rupturing pressure of the residual water from being reached.

When the freezing conditions of FIG. 3 take place, the pressure on the residual water can be in excess of 1400 psi which under conditions in a conventional hydrant, would cause the tube 12 to rupture. Because of the presence of the pressure relief valve 70, the pressure exerted on the residual water by the ice is reduced substantially below the rupture pressure which would normally exist and can be as low as 300 to 500 psi.

Thus, from the foregoing, it is seen that this invention will achieve all of its objectives.

We claim:

1. A freezeless wall hydrant, comprising, a normally horizontal fluid inlet tube having an interior end and an exterior end and a single aperture located in a portion therebetween, a hollow valve fitting rigidly secured to the interior end of the inlet tube for connection to a source of pressurized fluid, a head member rigidly secured to the outer end of the inlet tube and including a drain conduit in communication with an interior of the inlet tube for discharging water from the hydrant, a normally closed pressure relief valve mounted exteriorly of the aperture and in communication with the interior of the inlet tube and being located between the interior and exterior ends of the inlet tube to directly seal the aperture exteriorly of the inlet tube such that if residual fluid within and adjacent the exterior end of the inlet tube freezes and exerts extraordinary pressure on residual fluid within the inlet tube adjacent the interior end thereof, the pressure relief valve will open immediately to release a portion of the residual water from the inlet tube to relieve the extraordinary pressure of the residual fluid through the aperture.

2. The hydrant of claim 1 wherein the pressure relief valve is located adjacent the interior end of the inlet tube.

3. The hydrant of claim 1 wherein the pressure relief valve extends upwardly from the inlet tube and terminates in a fluid reservoir.

4. The hydrant of claim 2 wherein the pressure relief valve extends upwardly from the inlet tube and terminates in a fluid reservoir.

5. The hydrant of claim 1 wherein the pressure relief valve includes a block having a center bore communicating with the aperture in the inlet tube, and a spring valve element is in the bottom of the center bore to normally close the bore to fluid flow, and a resilient element is in the bore to normally hold the valve element in closed condition in the bottom of the center bore.

6. The hydrant of claim 5 wherein the resilient element has a compressive strength wherein it will not compress with a compressive force on the ball of less than 100 psi.

7. The hydrant of claim 5 wherein the resilient element is a compression spring.

8. A freezeless wall hydrant, comprising, a normally horizontal fluid inlet tube having an interior end and an exterior end and a single aperture located in a portion therebetween, a hollow valve fitting rigidly secured to the interior end of the inlet tube for connection to a source of pressurized fluid, a head member rigidly secured to the outer end of the inlet tube and including a drain conduit in communication with an interior of the inlet tube for discharging water from the hydrant, a normally closed pressure relief valve mounted exteriorly of the aperture and in communication with the interior of the inlet tube and being located between the interior and exterior ends of the inlet tube to directly seal the aperture exteriorly of the inlet tube such that if residual fluid within and adjacent the exterior end of the inlet tube freezes and exerts extraordinary pressure on residual fluid within the inlet tube adjacent the interior end thereof, the pressure relief valve will open immediately to release a portion of the residual water from the inlet tube to relieve the extraordinary pressure of the residual fluid through the aperture; and said closed pressure relief valve having a ball that seals the aperture of the fluid inlet tube.

* * * * *